Patented Oct. 2, 1945

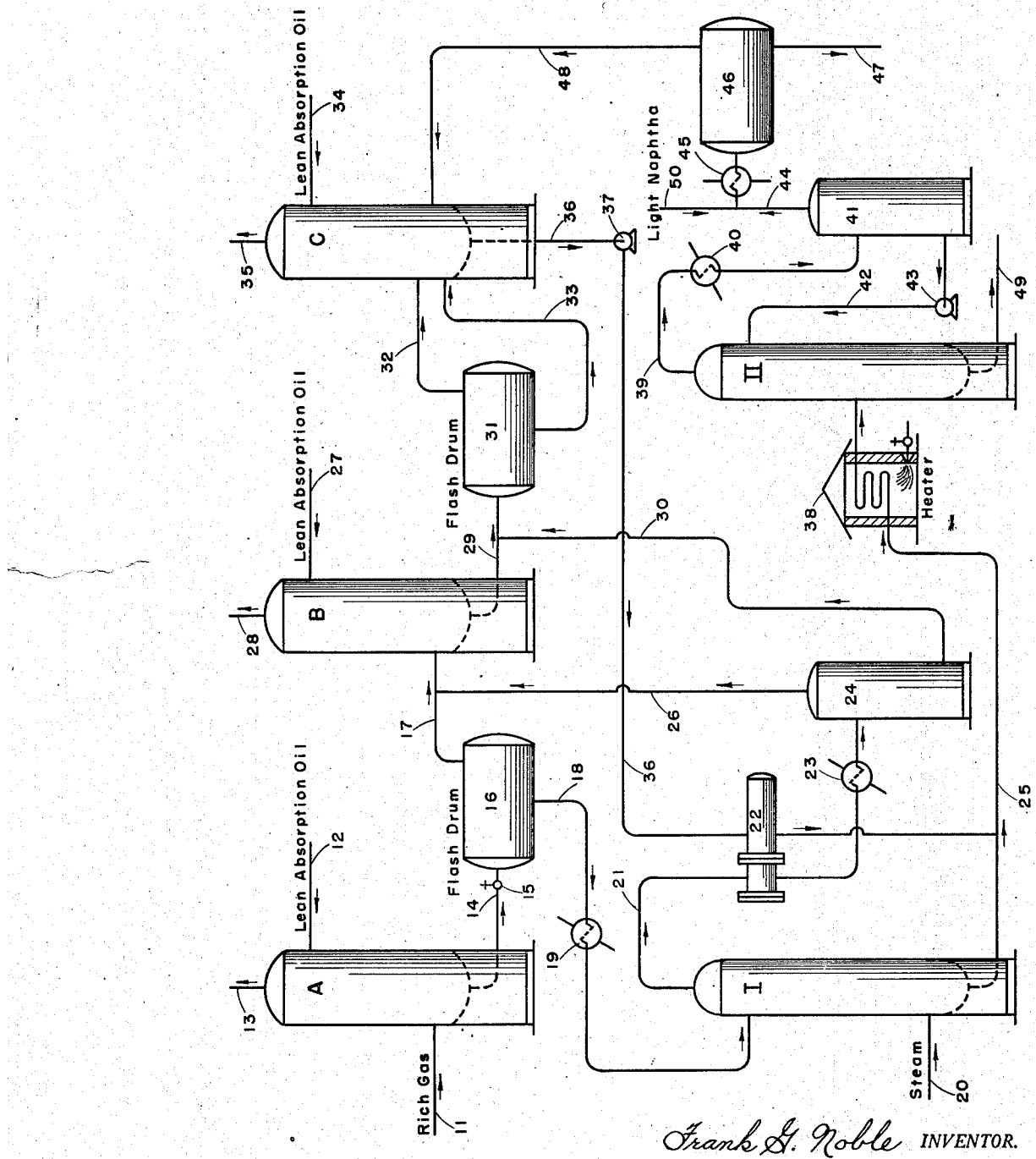

2,386,057

UNITED STATES PATENT OFFICE 2,386,057

METHOD FOR RECOVERING GASOLINE

Frank G. Noble, Houston, Tex., assignor to Standard Oil Development Company, a corporation of Delaware Application December 13, 1943, Serial No. 514,018

3 Claims. (Cl. 196—8)

The present invention is directed to a method for recovering gasoline constituents from a hydrocarbon mixture, and more specifically to the recovery of gasoline from the production of condensate wells.

At the present time it is conventional to recover gasoline constituents from the production of condensate wells by contacting a gaseous mixture containing gasoline constituents with an absorption oil to dissolve constituents in the gasoline boiling range and subsequently removing the constituents in the gasoline boiling range from the absorption oil by distillation. The amount of absorption oil required to remove the constituents in the gasoline boiling range from the lighter gases is relatively large, and heretofore the pumping of the rich absorption oil from the absorbers to the stripping stills has been troublesome and involved a considerable item of expense. In addition, it is usual to absorb the constituents in the gasoline boiling range at relatively high pressures which inherently cause the absorption oil to pick up substantial amounts of lighter hydrocarbons such as methane and ethane, and upon the removal of these lighter hydrocarbons at relatively high pressures it often happens that a large volume of gases must be circulated through the system by compressors.

It is an object of the present invention to arrange a system for removing constituents in the gasoline boiling range from a high pressure gaseous mixture by the use of absorption oil, and the subsequent recovery of the gasoline constituents by distillation, which involves a reduced number of mechanical pumping means for forcing the fluids through the system. Another object of the present invention is to recover gasoline constituents from a rich absorption oil under conditions which require the handling of only relatively small amounts of light hydrocarbons in the recovery system. Still another object of the present invention is to recover hydrocarbon constituents from a rich absorption oil with the efficient utilization of energy in respect to the heat added and heat removed from the components being treated.

Other advantages of the present invention will be seen from reading the following description taken with the drawing, in which the sole figure is in the form of a flow sheet diagrammatically illustrating a preferred method for practicing the invention.

Turning now specifically to the drawing, a rich gas such as produced by a condensate well is fed through line 11 into the bottom portion of absorber A. A stream of lean absorption oil is injected into the upper portion of tower A through line 12. The gas fed into the tower passes upwardly therein and contacts the absorption oil which is flowing countercurrent thereto in the tower. The lean gas, from which substantially all of the constituents in the gasoline boiling range have been removed, leaves the top of the tower through line 13.

Rich absorption oil, having dissolved therein constituents in the gasoline boiling range removed from the gas, as well as substantial amounts of lighter hydrocarbons such as methane and ethane, is emoved from tower A via line 14 and passes through valve 15 into flash drum 16. The pressure within the flash drum is maintained considerably below that in absorption tower A and allows the separation of a gaseous phase and a liquid phase. The gaseous phase is withdrawn from drum 16 by means of line 17 and the liquid phase is removed from the bottom of the drum through line 18.

The liquid fraction from vessel 16 is withdrawn through heating means 19 and into the upper portion of still I. The pressure within the still is less than that within drum 16 to allow the fluid to flow into still I without the use of mechanical pumps. The elimination of pumps for transferring the rich absorption oil is a substantial advantage in view of the large amount of rich oil necessarily handled in an absorption system.

Still I is operated without the return of extraneous reflux thereto. Stripping steam is injected into the lower portion of this vessel through line 20. An overhead fraction is removed through line 21, passed through heat exchanger 22 and condenser 23 to reduce the temperature thereof, and thence into accumulator 24. A bottoms fraction is removed from still I by means of line 25. The pressure and temperature within still I are regulated in accordance with the desired characteristics of the fraction removed from the bottom of the still. Substantially all of the methane and ethane constituents are stripped from the rich absorption oil in vessel I, and in addition a portion of the propane, butane and heavier hydrocarbons are removed therefrom. It may at times be desirable to include substantial amounts of propane in the bottom fraction, while at other times it will be desirable to eliminate as much propane as possible, and these changes in the composition of this fraction are readily accomplished by regulating the temperature and pressure of still I and the amount of stripping steam added thereto.

From accumulator 24 a gaseous fraction is removed through line 26 and admixed with the vapors from the vessel 16 flowing through line 17. The admixture of vapors mingled in line 17 is passed into the lower portion of a second absorber vessel B. Lean absorption oil is passed into the upper portion of vessel B through line 27 and flows downwardly therethrough countercurrent to the rising stream of gases to remove therefrom heavier hydrocarbons in the gasoline boiling range. Light hydrocarbons in the methane and ethane boiling range are removed from the upper portion of vessel B through line 28 and are discarded from the system. Rich absorption oil is removed from vessel B through line 29 and has admixed therewith condensate removed from accumulator 24 and injected into line 29 by means of line 30. The admixture of condensate and rich absorption oil commingled in line 29 is discharged into flash vessel 31. A vapor fraction and a liquid fraction from vessel 31 are removed through lines 32 and 33, respectively, and are injected into the lower portion of absorption vessel C. Lean absorption oil is passed into the upper portion of vessel C by means of line 34 and flows downwardly countercurrent to the rising gaseous materials. Inabsorbed gases leave the top of vessel C by means of line 35 and the rich absorption oil is removed by line 36 and forced by pump 37 through heat exchanger 22, where it aids in condensing the overhead from still I, and thence into line 25, where it is commingled with the bottom fraction from still I.

The admixture of the bottom fraction from still I and the rich absorption oil from absorber C flows through line 25, heater 38 and into still II. An overhead fraction comprising components in the gasoline boiling range is removed from still II by means of line 39 and passed through condenser 40 into vessel 41. Liquid from vessel 41 is withdrawn through line 42 and returned by means of pump 43 into the upper portion of still II to serve as extraneous reflux for the still. Vapors from vessel 41 are removed from the top thereof by means of line 44 and passed through water-cooled condenser 45 and into accumulator vessel 46. At times a light naphtha fraction suitable for blending with the overhead from still II may be available, and such a fraction may conveniently be injected into line 44 through line 50 to aid in condensing the vapors in this line.

It is desirable to operate the system to obtain a product completely condensable at atmospheric temperatures within vessel 46, and under such conditions total condensation is obtained and the liquid product may be withdrawn from the bottom of the vessel by means of line 47. However, under some circumstances it may be desirable to include within the overhead of still II light hydrocarbons uncondensable at atmospheric temperatures under the pressures obtaining within vessel 46, and under such circumstances the uncondensable vapors may be withdrawn from the upper portion of vessel 46 by means of line 48 and returned to absorber C.

The removal of hydrocarbon constituents in the gasoline boiling range as overhead in still II leaves as a bottom fraction the oil originally added into the absorber vessels A, B and C as absorption oil, and in addition hydrocarbons boiling above the gasoline boiling range extracted from the gaseous mixtures fed into the system. This bottoms fraction may be withdrawn from still II by means of line 49 and further distilled in means not shown to recover lean absorption oil, which may then be returned to absorption vessels A, B and C to serve as the lean absorption oil in these absorption vessels.

From the above description it will be seen that I have obtained the objects of the present invention. The flow of fluids from the first absorption vessels on through the system has involved only two mechanical pumps, one for removing rich absorber oil from absorber C and one for returning reflux to still II. The light hydrocarbons in the methane and ethane boiling range are stripped from the rich absorber oil in still I under relatively high pressures and passed into absorber vessel B. The maintenance of a high pressure upon these gaseous materials allows the use of relatively small units. It will further be seen that this arrangement allows total condensation of the overhead removed from still II and eliminates the necessity for recycling low pressure vapors.

In the practice of the present invention the operating pressures should be such that the rich oil in drum 16 is flashed at a pressure of not less than ten atmospheres. The liquid fraction removed from flash drum 16 by line 18 should be heated to a temperature of not less than 300° F. and preferably to a temperature in the range of 400° to 450° F. before it is passed into distillation zone I. The mixture of bottoms from distillation zone I and rich absorption oil from absorber C is preferably heated to a temperature of approximately 500 F. in heater 38 before it is discharged into distillation zone II which is advantageously operated at a pressure of approximately 65 pounds per square inch.

As an illustration of preferred operating conditions, the following example is given. It is to be understood that I do not intend to be bound by the limitations expressed in this example, and that the operating conditions may be varied over a wide range and advantages of the present invention retained.

The vaporous mixture produced by a condensate well at a pressure of 1800 pounds per square inch was allowed to flow into a separator and the resulting gaseous fraction contacted with absorption oil in an absorber at a pressure of 1800 pounds per square inch. The liquid fraction from the separator was flashed at 800 pounds per square inch, the resulting vapors passed through an absorber and the resulting rich absorption oil admixed with that from the 1800-pound absorber and passed through a 600-pound reabsorber. This preliminary absorption of gaseous product from the condensate well is indicated diagrammatically as carried out in vessel A in the drawing. The rich absorption oil at 600 pounds per square inch was withdrawn from vessel A and its pressure reduced to 250 pounds per square inch in drum 16. The liquid fraction from the flash drum was heated to 420° F. and passed into still I at a pressure of 205 pounds per square inch. The overhead from still I was cooled to 90° F. and passed into accumulator 24. Vapors from accumulator 24 were mingled with those from flash drum 16 and passed through absorber B, operated at 200 pounds per square inch. The rich oil from absorber B was commingled with the liquid from accumulator 24 and the pressure of the mixture reduced to 35 pounds per square inch in flash drum 31, and the vapor and liquid fraction from drum 31 was then contacted with absorption oil in vessel C at 35 pounds per square inch. Rich oil from vessel C was passed through heat exchanger 22 to increase its temperature to 250° F. and commingled with bottoms from vessel I, and the commingled mixture was then heated to 530° F. and passed into still II, maintained at 65 pounds per square inch. An unstabilized naphtha fraction obtained from the well condensate was blended with the vapors removed from still II via line 44 and the mixture was completely condensed at 90° F. under a pressure of 60 pounds per square inch.

The composition of the liquid fraction and the vapor fraction from drum 16, the liquid fraction and the vapor fraction from accumulator 24, the bottoms from still I, the rich oil from absorber C, the feed to still II, the naphtha blended with the vapors from still II, and the product in accumulator 46 obtained when operating in accordance with the above example is given in the following table. In addition, the total mols per day of each of these enumerated fractions is given in the table.

TABLE I

*Hydrocarbon analyses—mol per cent*

| Hydrocarbon | Drum 16 | | Accumulator 24 | | Bottoms from still I, Liquid |
|---|---|---|---|---|---|
| | Liquid | Vapor | Liquid | Vapor | |
| $C_1$ | 6.34 | 84.64 | 2.66 | 45.17 | 0.00 |
| $C_2$ | 4.83 | 10.26 | 10.21 | 27.56 | 0.36 |
| $C_3$ | 5.71 | 3.61 | 22.93 | 18.34 | 1.82 |
| $C_4$ | 5.26 | 1.17 | 25.53 | 7.48 | 2.85 |
| $C_5$ to $C_7$ | 5.66 | 0.32 | 20.22 | 1.45 | 4.93 |
| Naphtha | 1.63 | | 2.03 | | 1.87 |
| Kerosene abs. oil | 70.57 | | 16.42 | | 88.17 |
| | 100.00 | 100.00 | 100.00 | 100.00 | 100.00 |
| Mols/day | 92,731 | 10,433 | 7,248 | 12,605 | 72,878 |

| Hydrocarbon | Rich oil from absorber C, liquid | Feed to still II | Condensate added via line 50 | Accumulator 46 |
|---|---|---|---|---|
| $C_1$ | 0.20 | 0.04 | 0.36 | 0.28 |
| $C_2$ | 2.17 | 0.72 | 3.90 | 4.50 |
| $C_3$ | 9.93 | 3.41 | 11.56 | 20.08 |
| $C_4$ | 15.71 | 5.37 | 17.04 | 31.42 |
| $C_5$ to $C_7$ | 9.76 | 5.88 | 67.14 | 43.72 |
| Naphtha | 0.87 | 1.67 | | |
| Kerosene abs. oil | 61.36 | 82.91 | | |
| | 100.00 | 100.00 | 100.00 | 100.00 |
| Mols/day | 17,798 | 90,676 | 3,356 | 17,339 |

From the above table it will be seen that the rich oil from absorber C contains appreciable amounts of $C_1$ to $C_4$ hydrocarbons. However, the bottoms from still I have been so thoroughly stripped of the lighter constituents that the addition thereto of the small amounts of light hydrocarbons from absorber C does not prevent the production of an overhead from still II capable of total condensation at atmospheric temperatures. In fact, unstabilized naphtha from an extraneous source was added to the overhead from still II without preventing total condensation. The small amount of low molecular weight hydrocarbons charged to still II allows this unit to operate at a lower pressure than conventionally employed, which, in turn, results in substantial reductions in the cost of such utilities as stripping steam, cooling water and pumping.

It will be understood that, although I have given an example illustrating the practice of the present invention, I do not intend to be bound by the conditions set out in this example. It will be obvious to a skilled workman that changes in operating conditions such as the composition of the feed and the temperatures and pressures in the several units may be varied over a wide range without departing from the scope of the invention.

Having fully described the present invention, what I desire to claim is:

1. In a process for recovering gasoline constituents from natural gas comprising hydrocarbons ranging from methane to constituents in the gasoline boiling range, the steps of contacting said gas with a first lean absorption oil in a first absorption zone to absorb constituents in the gasoline boiling range and lighter hydrocarbons from said gas and to produce a first rich absorption oil, transferring the first rich absorption oil to a flashing zone at a lower pressure than the first absorption zone, removing substantial amounts of methane and ethane as vapors from the flashing zone, removing the remaining liquid from the flashing zone, increasing the temperature thereof to no less than 300° F. and feeding the heated material into a stripping still operated under a pressure lower than the flashing zone and without the addition of extraneous reflux thereto to separate a bottoms fraction and overhead fraction, said overhead fraction including substantially all the methane and ethane, subjecting the overhead fraction to condensing conditions to form a liquid portion and a vaporous portion, contacting the vaporous portion of the overhead fraction and the vapors removed from the flashing zone with a second lean absorption oil to obtain a second rich absorption oil, admixing said second rich absorption oil with the liquid portion of overhead fraction to form a first admixture, contacting the first admixture with a third lean absorption oil to form a third rich absorption oil, admixing the third rich absorption oil with the bottoms removed from said stripping still to form a second mixture, heating the second admixture and feeding it into a second still and operating said second still under temperature and pressure conditions to remove an overhead therefrom substantially completely condensable at atmospheric temperatures under the operating pressure of the still.

2. A method for recovering hydrocarbons in the gasoline boiling range from a mixture of gases including hydrocarbons boiling from methane upwardly through the gasoline boiling range comprising the steps of contacting said gaseous mixture with a first lean absorption oil to form a first rich absorption oil, reducing the pressure on said first rich absorption oil in a flashing zone to cause the separation of a vapor fraction and liquid fraction, removing said fractions separately from the flashing zone, heating said liquid fraction and feeding it into a first still maintained at a lower pressure than said flashing zone, operating said first still without the addition of extraneous reflux thereto to form an overhead fraction and a bottoms fraction, subjecting the overhead fraction to condensing conditions to form a liquid portion and a vaporous portion, passing the vaporous portion and the vapors from the flashing zone into a second absorber zone and contacting them therein with a second lean absorption oil to form a second rich absorption oil, admixing said second rich absorption oil with the liquid portion of the overhead fraction to form a first admixture, transferring the components of the first admixture to a third absorber zone and contacting them therein with a third lean absorption oil to form a third rich absorption oil, admixing the third rich absorption oil with bottoms fraction removed from the first still to form a second admixture, heating said second admixture and passing it to a second still, removing an overhead fraction from said second still and condensing it to form an unstabilized gasoline.

3. A method for recovering casinghead gasoline from a condensate well comprising the steps of passing product from a condensate well through a first absorber zone maintained at a pressure of approximately 600 pounds per square inch countercurrent to a first absorbent oil to form a rich absorbent oil, flashing the rich absorbent oil in a flash zone at a pressure of approximately 250 pounds per square inch to form a gaseous fraction and a liquid fraction, heating the liquid fraction to a temperature in the range of 400° to 450° F. and passing it to a first distillation zone where it is distilled at a pressure less than that in said flash zone, operating said first distillation zone without the addition of extraneous reflux thereto and with the addition of stripping steam, removing an overhead fraction from said first distillation zone and condensing it to form a liquid portion and a vaporous portion, admixing said vaporous portion with the vapors removed from said flash zone and passing said admixture through a second absorption zone maintained at a pressure of approximately 200 pounds per square inch in contact with a second absorption oil to form a rich absorption oil, admixing the rich second absorption oil with the liquid portion from the overhead of the first still, and passing said admixture into a third absorption zone in contact with a third absorption oil to form a third rich absorption oil, admixing the rich third absorption oil with the bottoms from the first distillation zone, heating the admixture to a temperature of approximately 500° F. and passing it into a second distillation zone maintained under a pressure of approximately 65 pounds per square inch, removing an overhead fraction from said second distillation zone and condensing it to form an unstabilized gasoline.

FRANK G. NOBLE.